(12) United States Patent
Nugier et al.

(10) Patent No.: US 11,884,106 B2
(45) Date of Patent: Jan. 30, 2024

(54) TIRE FOR OFF-ROAD VEHICLE HAVING IMPROVED ENDURANCE

(71) Applicant: COMPAGNIE GENERALE DES ETABLISSEMENTS MICHELIN, Clermont-Ferrand (FR)

(72) Inventors: Franck Nugier, Clermont-Ferrand (FR); Valérie Feuardent, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 591 days.

(21) Appl. No.: 16/649,313

(22) PCT Filed: Sep. 25, 2018

(86) PCT No.: PCT/FR2018/052352
§ 371 (c)(1),
(2) Date: Mar. 20, 2020

(87) PCT Pub. No.: WO2019/058084
PCT Pub. Date: Mar. 28, 2019

(65) Prior Publication Data
US 2020/0262243 A1 Aug. 20, 2020

(30) Foreign Application Priority Data
Sep. 25, 2017 (FR) ....................... 1758819

(51) Int. Cl.
*B60C 11/04* (2006.01)
*B60C 11/00* (2006.01)
*B60C 11/12* (2006.01)

(52) U.S. Cl.
CPC ............ *B60C 11/005* (2013.01); *B60C 11/04* (2013.01); *B60C 11/1204* (2013.01);
(Continued)

(58) Field of Classification Search
CPC ............... B60C 11/005; B60C 11/1218; B60C 11/1263; B60C 11/1281; B60C 11/04; B60C 2011/0025; B60C 2011/1213
See application file for complete search history.

(56) References Cited

U.S. PATENT DOCUMENTS

| 8,939,183 B2 | 1/2015 | Barraud et al. |
| 2006/0269636 A1* | 11/2006 | Miyamae ............ B60C 11/0309 425/35 |

(Continued)

FOREIGN PATENT DOCUMENTS

| CN | 105899375 | 8/2016 |
| EP | 1 834 813 | 9/2007 |

(Continued)

OTHER PUBLICATIONS

Machine translation for Japan 2004-262295 (Year: 2022).*
Machine translation for Romania 104195 B (Year: 2022).*
Machine translation for Japan 07-081323 (Year: 2023).*

*Primary Examiner* — Steven D Maki
(74) *Attorney, Agent, or Firm* — Cozen O'Connor

(57) ABSTRACT

Tire (1) for an off-road vehicle, comprising a crown and a tread (22) having a width W and a thickness E of wearable material, this tread (22) having a superposition of at least two layers of materials, a first layer (221) radially on the inside and a second layer (222) radially on the outside of the first layer (221) to contact the ground when the tire is new, this second layer (222) having a thickness E2 relative to the thickness E of wearable material, the tread (22) being provided with at least two narrow grooves (4, 5) running all around the tire which have a zigzagging shape of wavelength L and amplitude A, the wavelength L being between 10% and 120% of the axial width W of the tread (22), and the amplitude A being between 10% and 75% of axial width W. The material of the first layer (221) is chosen with low (Continued)

hysteresis; with a measured tan(δ) value at most equal to 0.30.

20 Claims, 3 Drawing Sheets

(52) U.S. Cl.
CPC ...... *B60C 11/1218* (2013.01); *B60C 11/1263* (2013.01); *B60C 11/1281* (2013.01); *B60C 2011/0025* (2013.01); *B60C 2011/1213* (2013.01); *B60C 2200/14* (2013.01)

(56) References Cited

U.S. PATENT DOCUMENTS

| | | | |
|---|---|---|---|
| 2007/0199633 A1* | 8/2007 | Hayashi | B60C 11/0311 152/DIG. 3 |
| 2011/0005649 A1* | 1/2011 | Aoki | B60C 11/0306 152/209.1 |
| 2012/0000586 A1* | 1/2012 | Kami | B60C 11/0332 152/209.18 |
| 2012/0298271 A1* | 11/2012 | Bijaoui | B60C 11/005 152/209.25 |
| 2016/0318348 A1* | 11/2016 | Cambon | B60C 11/1307 |
| 2018/0009274 A1* | 1/2018 | Kakuta | B60C 13/02 |

FOREIGN PATENT DOCUMENTS

| | | | |
|---|---|---|---|
| EP | 2 251 214 | | 11/2010 |
| EP | 3 181 376 | | 6/2017 |
| FR | 2940185 | | 6/2010 |
| FR | 3 044 596 | | 6/2017 |
| JP | 07-081323 A | * | 3/1995 |
| JP | 2004 262295 | | 9/2004 |
| JP | 2004-262295 A | * | 9/2004 |
| RO | 104195 B | * | 11/1993 |
| WO | WO 2015/150542 | | 10/2015 |
| WO | WO 2015/182078 | | 12/2017 |

* cited by examiner

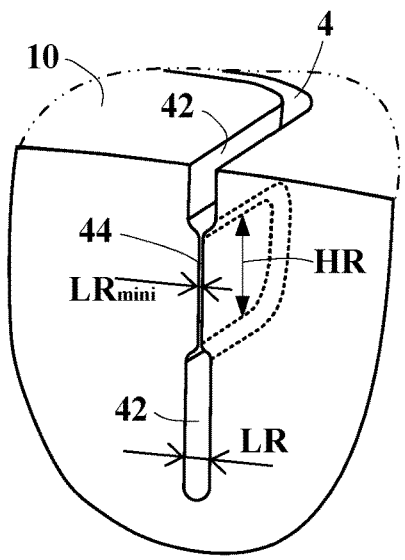
FIG. 5 (V-V)
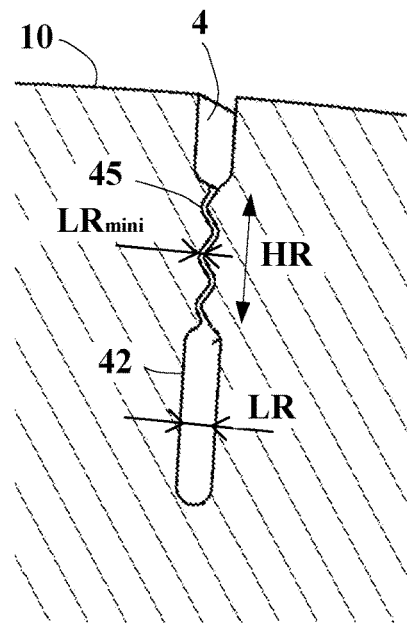
FIG. 6 (V-V)
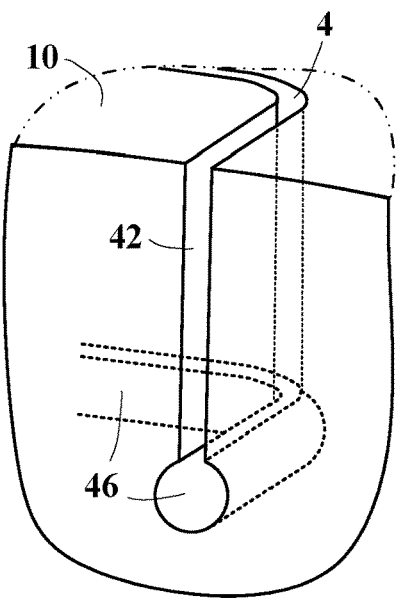
FIG. 7 (V-V)
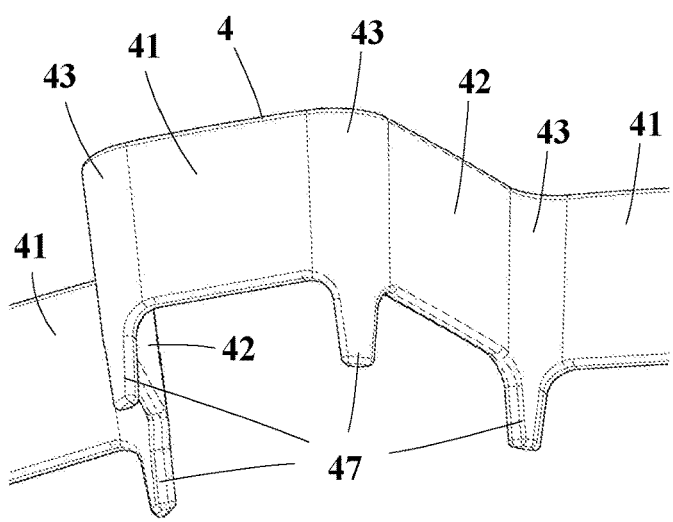
FIG. 8

TIRE FOR OFF-ROAD VEHICLE HAVING IMPROVED ENDURANCE

RELATED APPLICATIONS

This is a U.S. National Phase Application under 35 USC 371 of International Application PCT/FR2018/052352 filed on Sep. 25, 2018.

This application claims the priority of French application no. 17/58819 filed Sep. 25, 2017, the entire content of which is hereby incorporated by reference.

FIELD OF THE INVENTION

The present invention relates to a tire that can be of radial structure and is intended to be fitted to an "off-road" (or "off-the-road") vehicle employed in civil engineering work; it relates more particularly to the tread of such a tire and to the tread pattern design thereof.

More particularly, the invention relates to the tires used on vehicles working in underground mines (engaged in "underground mining"), these tires being provided with a very thick tread usually having no tread pattern design. These tires correspond to the tires referenced E4 or L4 or L5 according to the usage codings standardized in the ISO, ETRTO, TRA, JATMA regulations.

The thickness of the tread of such tires and, more particularly, the wearable thickness of material for such tires is at least 50 mm, and may, these days, range to as much as 150 mm.

Definitions

An equatorial mid-plane is a plane perpendicular to the axis of rotation and passing through the points of the tire that are radially farthest from the said axis. This plane divides the tire into two equal halves.

A radial direction means, in the present document, a direction which is perpendicular to the axis of rotation of the tire (this direction corresponds to the direction in which the thickness of the tread is measured).

A transverse or axial direction means a direction parallel to the axis of rotation of the tire.

A circumferential direction means a direction tangential to any circle centred on the axis of rotation. The circumferential direction is perpendicular both to the axial direction and to a radial direction.

Axially or radially outwards means a direction oriented towards the outside of the internal cavity of the tire, this cavity containing the air with which the tire is inflated.

The usual conditions of running of the tire are those defined, for example, in the ETRTO European standard; these conditions of use specify the reference inflation pressure corresponding to the load-bearing capability of the tire as indicated by its load index and its speed rating. These conditions of use can also be referred to as "nominal conditions" or "working conditions".

A cut generically denotes either a groove or a sipe (or in the latter case a narrow groove) and corresponds to the space delimited by walls of material that face one another and are at a non-zero distance (referred to as the "width of the cut") from one another. It is precisely this distance that distinguishes a sipe or narrow groove from a groove; in the case of a sipe or narrow groove, this distance is appropriate for allowing the opposing walls delimiting the said sipe to come into at least partial contact when in the contact patch in which the tire is in contact with the ground. In the case of a groove, the walls of this groove cannot come into contact with one another under usual running conditions.

BACKGROUND OF THE INVENTION

A tire intended to be fitted to an off-road vehicle comprises a crown part, sidewalls extending this crown part on either side, these sidewalls ending in beads. These beads are intended to provide mechanical connection between the tire and the rim on which it is mounted.

The crown part of the tire comprises a reinforcement surmounted radially on the outside by a tread intended to come into contact with the ground during running. This tread has, radially on the outside, a tread surface intended to provide contact between the tire and the ground. This tread comprises a thickness of material that can be worn away during running.

Furthermore, the tire comprises a carcass reinforcement extending both in the crown part of the tire and in the sidewalls in order to be anchored in each bead. This carcass reinforcement is made up of one or more carcass layers, each carcass layer comprising a plurality of reinforcing cords, generally made of metal in the case of this type of tire, these reinforcers being positioned one beside another and coated in an elastomer material. In the case of a tire of radial construction, the reinforcing cords of the carcass reinforcement are oriented radially, which means to say so that they make an angle equal to or close to 90 degrees with respect to the circumferential direction.

Furthermore, this carcass reinforcement is surmounted radially on the outside in the crown part by a crown reinforcement, the latter itself being surmounted by the tread.

The crown reinforcement comprises a working reinforcement formed of at least two working layers the function of which is to form a belt around the tire in order to give the tire stiffness and thus ensure good road-holding of the tire. This working reinforcement may further comprise one or more hooping layers formed of reinforcers oriented at a small angle or angle equal to zero degrees with respect to the circumferential direction. The working reinforcement absorbs both mechanical stresses of inflation, which are generated by the tire inflation pressure, and mechanical stresses caused by running, which are generated as the tire runs over the ground and are transmitted by the tread.

Furthermore, and in order to limit the consequences of attacks during running over uneven ground, the crown reinforcement may comprise at least one so-called protective layer. This protective layer is made of elastic metal cords, parallel to one another; elastic meaning a metallic cord which exhibits great elongation under light load. This protective layer is positioned as close as possible to the tread, namely radially on the outside of the crown reinforcement.

The tread of such a tire intended to be fitted to an off-road vehicle has a large thickness of wearable material, namely a thickness at least equal to 50 mm. It is common practice to provide, for a tire having such thicknesses and having no tread pattern design on its tread, a notch located on one of the lateral edges of the tread and the bottom of which is positioned radially above the crown reinforcement. This notch acts as a visual marker to monitor the tread wear and determine the opportune moment for replacing or recapping the tire.

This large thickness is needed in order to withstand the harsh conditions of running over uneven ground on which there are numerous objects that may be aggressive in nature.

It has been found that having a great thickness of elastomer material, combined with particularly harsh conditions of use, notably a particularly high load, may cause significant increases in temperature at certain points on the tire and more specifically in the tread. The temperature level reached may become a factor that requires the setting of limits in the use of the tire. For example, the user is often made to limit the maximum speed of the vehicle in order to limit the level of heat in the tread and in the vicinity of the axial ends of the layers of the crown reinforcement.

One known way for partially alleviating this problem is to provide the tread with cuts (wide grooves and/or narrow grooves), namely to use moulding to form a network of cuts that are open onto the tread surface of the tread, these cuts extending into the thickness of the tread. These cuts, as a result of the presence of the walls that delimit them, act as thermal ventilation means in the material of which the tread is made. However, these same cuts lead to a decrease in the stiffness of the tread, and this generates greater deformations of the tread as a result of compression and shearing during running. These same cuts, when their width is substantial, may weaken the tread by allowing foreign bodies to be captured within these cuts. Once captured, these foreign bodies may travel towards the bottom of the cuts and gradually harm the tread material or even the crown reinforcement and thus cause the metal cords of the crown reinforcement to corrode through the ingress of water.

One solution to these problems has been proposed in document EP 2251214, according to which solution circumferentially oriented narrow grooves are formed. What is meant here by a narrow groove is a groove of which the width (namely the mean distance separating the opposing walls) is determined so that the walls delimiting this groove close up and come into contact with one another at least partially when they enter the contact patch in which the tire is in contact with the ground. The term sipe may also be used to denote a narrow groove.

SUMMARY OF THE INVENTION

Research has been undertaken by the Applicant in order to further improve the performance of tires with great tread thickness and determine a particular geometry of narrow groove which, in combination with the presence of specific materials in this tread, provides better thermal ventilation and thus makes it possible to increase the running-speed limit, while at the same time affording the tread sufficient protection against attack suffered during running.

This objective has been achieved, according to an embodiment of the invention, by a tire for an off-road vehicle, comprising:

a crown part extended on each side by sidewalls, these sidewalls ending in beads, a carcass reinforcement extending in the crown part, the sidewalls and the beads, this crown part comprising a crown reinforcement comprising a working reinforcement and protective reinforcement, this crown reinforcement being situated radially on the carcass reinforcement and radially on the outside of a tread having a width W and a thickness E of wearable material, this thickness E of wearable material being at least equal to 50 mm, this tread comprising a superposition of at least two layers of materials, a first layer located radially on the inside and a second layer located radially on the outside of the first layer, this second layer coming into contact with the ground when the tire is new, this second layer having a thickness comprised between 20% and 90% of the thickness E of wearable material, the tread being provided with at least two narrow grooves running all around the tire.

This tread is characterized in that:

the narrow grooves have a zigzagging overall shape of wavelength L and amplitude A, the wavelength L being comprised between 10% and 120% of the axial width W of the tread, and the amplitude A being comprised between 10% and 75% of this same axial width W, the material of the first layer of the tread is chosen to have low hysteresis; what is meant by low-end hysteresis here is a material of which the measured tan($\delta$) value is at most equal to 0.30.

A cut runs all around the tire when it is continuous and extends all around the tire, namely all around its axis of rotation. It is of the zigzagging overall shape when it has a geometry that is crenellated or sinusoidal or undulating about a mean circumferential direction. The amplitude A of this zigzagging overall shape is measured in the transverse direction (direction parallel to the axis of rotation of the tire) and its wavelength L is measured in the circumferential direction.

In the present document, the measured tan($\delta$) value, that measures the hysteresis loss factor of a rubbery material, is obtained on test specimens taken from the tire. Each cylindrical test specimen of material has a height of 2 mm and a diameter of 10 mm, and is subjected to a simple alternating sinusoidal shear stress, at a frequency of 10 Hz and at a temperature of 60° C. on a viscoanalyser (Metravib VA4000) according to Standard ASTM D 5992-96. A strain amplitude sweep is carried out from 0.1% to 100% peak-to-peak (outward cycle) and then from 100% to 0.1% peak-to-peak (return cycle). The results exploited are the complex dynamic shear modulus (G*) and the loss factor tan($\delta$). For the outward cycle, the maximum value of tan($\delta$) observed, denoted tan($\delta$)max; and also the modulus G* at 50% strain, denoted G*50%, are indicated. The dynamic properties, particularly tan($\delta$)max, indicative of the hysteresis, are measured.

As a preference, the material adopted for the first layer of the tread is a material that has a tan($\delta$) value at most equal to 0.20.

Advantageously, the amplitude A of the zigzagging narrow grooves is comprised between 10% and 40% of the width W of the tread.

Each zigzagging narrow groove has a maximum depth which is at least equal to 20% of the thickness E of wearable material and at most equal to 90% of the same thickness E.

More preferably still, the maximum depth of the zigzagging narrow grooves is comprised between 40% and 70% of the thickness E of wearable material.

According to one preferred embodiment of the invention, the tread comprises two narrow grooves of zigzagging overall shape, these grooves being situated one on each side of the equatorial mid-plane. Each narrow groove is formed entirely in one half of the width of the tread, so that there is delimited, between the said narrow grooves, a central part of a width comprised between 0% and 70% of the width W of the tread.

Advantageously, the central part, between two zigzagging narrow grooves formed in each of the edges of the tread, has a width comprised between 40% and 70% of the width W of the tread. If this width is greater than 70%, then the effect on the level of heat is insufficient. If the width is too small and less than 40%, the stresses in the central part are higher and may affect the endurance of the tread.

In this embodiment, the central part, of a width comprised between 40% and 70% of the width W of the tread, is provided with a plurality of narrow grooves arranged uniformly or near-uniformly around the tire.

In a particularly advantageous alternative form of embodiment, a plurality of mechanical bridges are created in the zigzagging narrow grooves, at least in the parts oriented chiefly circumferentially and situated axially furthest towards the outside. This bridging formed from the bottom of the narrow grooves mechanically connects the opposing walls and locally reduces the depth of these narrow grooves by at least 20% and preferably 50% of the maximum depth of these narrow grooves. Thanks to this bridging, it is possible to afford the tread sufficient protection against potential attack experienced during running.

This latest alternative form of embodiment comprising a bridging in the narrow grooves may be further improved by forming bridging on all the parts oriented chiefly circumferentially.

As a preference, each zigzagging narrow groove comprises a plurality of groove parts oriented chiefly circumferentially, each of these parts having a length Lc measured in projection onto the circumferential direction. Each narrow groove further comprises a plurality of groove parts oriented transversely or obliquely at an angle D at most equal to 45 degrees to the axial direction. The circumferential groove parts and the transverse groove parts of which the zigzagging narrow grooves are made are arranged in alternation and are joined to one another by connecting groove parts to form a continuous groove, the overall shape of which undulates or zigzags about a mean circumferential direction.

By virtue of the presence of these at least two zigzagging narrow grooves, a surface for heat exchange with the surrounding air is created, this heat exchange surface corresponding to each of the walls that delimits a narrow groove. Advantageously, each narrow-groove wall, when new, has a surface area which is comprised between three and seven times the equivalent transverse surface area of the tread, the latter surface area being the product of the width W of the tread times the thickness E of wearable material.

According to one preferred embodiment, the narrow grooves formed on each edge are phase-shifted relative to one another in the circumferential direction so as to reduce the vibrations caused by their presence.

In another preferred embodiment, a third narrow groove of zigzagging overall shape is formed axially between the two zigzagging narrow grooves formed in the vicinity of the edges of the tread. According to one alternative form, this third narrow groove has a maximum depth equal to or close to the maximum depth of the other two narrow grooves and may have a wavelength equal to or different from that of the edge narrow grooves.

The depth of each narrow groove is limited to at most 80% of the thickness E of wearable material so as to maintain sufficient mechanical connection between the shoulder part of the tread and the rest of the tread and thus limit the risk of chunking in the event of high stress loading.

According to one preferred embodiment, the second layer (which means to say the layer of material radially on the outside of the first layer) of which the tread is made has a tear index, defined as being the mean deformation at break, which is at least equal to 400%, and an energy at break at least equal to 50 MJ.

The tear index of an elastomeric material is measured using a test specimen of parallelepipedal shape, having the dimensions: 10 mm×85 mm×2.5 mm and notched at its middle by three notches having a depth of 5 mm. This test specimen is subjected, in a chamber set to a temperature of 100° C., to a tensile tear-strength test until it breaks. The force at break and the deformation at break are recorded. The energy needed to cause the test specimen to break is calculated as being the product of the force at break times the deformation at break.

Further features and advantages of the invention will become apparent from the following description provided with reference to the appended drawings which show, by way of non-limiting examples, embodiments of the subject matter of the invention.

BRIEF DESCRIPTION OF THE DRAWINGS

FIG. 4 shows a transverse cross section of the third alternative form of tire shown in

FIG. 3.

FIGS. 5 to 8 show details of embodiments of the invention.

DETAILED DESCRIPTION OF THE DRAWINGS

Figure 1:
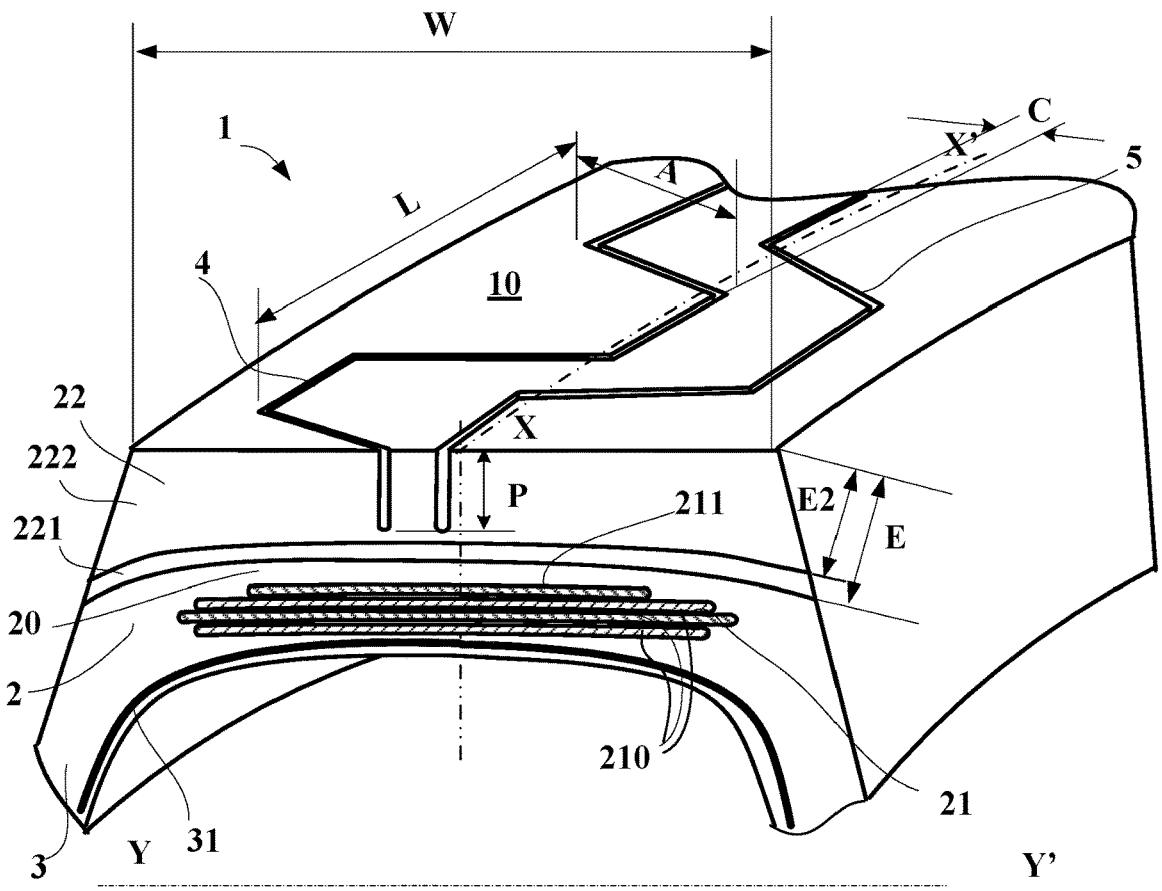
FIG. 1 shows a volume view of a first alternative form of tire according to an embodiment of the invention.

FIG. 1 shows a volume view of the first alternative form according to the invention of a tire 1 of size 29.5 R 29 for an off-road vehicle used for civil engineering work. In this alternative form, the tire 1 comprises a crown part 2 extended on each side by sidewalls 3, these sidewalls 3 ending in beads which have not been shown in this FIG. 1, and a carcass reinforcement 31 extending in the crown part 2, in the sidewalls 3, and in the beads.

The crown part 2 is surmounted radially on the outside by a tread 22 of width W equal to 680 mm and with a thickness E of wearable material equal to 110 mm, the tread surface 10 of which can be seen in FIG. 1. The crown part 2 comprises a crown reinforcement 21 made up of several working layers 210 stacked on one another and a protective reinforcement 211 positioned radially on the outside of the working layers.

The tread 22 is formed by the superposition of two layers of materials, a first layer 221 and the second layer 222, this second layer 222 being located radially on the outside of the first layer 221 so as to come into contact with the ground when the tire is new, this second layer 222 having a thickness equal to 92 mm. The thickness of the first layer 221 is equal to 18 mm, and is intended to be worn away during running once the second layer 222 has been completely worn away.

The material of the first layer 221, which is situated radially on the inside of the second layer 222, is chosen to have a low hysteresis value characterized by a tan(δ) value here equal to 0.11, this tan(δ) value big obtained under the conditions specified in the present document.

Moreover, the material of the second layer 222 of the tread 22 which is in contact with the ground when new, has an elongation at break equal to 773% and an energy at break equal to 103 MJ. Such material is for example described in the patent application published under reference WO 2015/150542 A1.

An intermediate layer 20 is interposed between the crown reinforcement 21 and the tread 22; this intermediate layer has the notable purpose of connecting the tread to the rest of the tire and of adding protection to the crown reinforcement once the first layer 221 of the tread comes into contact with the ground during running after the second layer 222 has worn away.

Two zigzagging narrow grooves 4, 5 having the same geometry are formed in this tread 22, by moulding, these zigzagging narrow grooves are continuous and pass all around the tire about its axis of rotation (indicated by the direction YY' in this FIG. 1). The zigzagging narrow grooves 4, 5 have the same maximum depth P equal to 70 mm and a mean width equal to 6 mm, this mean width being suitable for allowing the walls delimiting these zigzagging narrow grooves 4, 5 to come at least partially into contact with one another when the tire is being driven on. The zigzagging narrow grooves are present when new in order to provide effective ventilation, and disappear as soon as the tread has a reduced thickness, and therefore has less of a tendency to heat up during running.

Each zigzagging narrow groove 4, 5 has a crenellated shape for which a wavelength L, here equal to 240 mm, and an amplitude A, equal to 300 mm, are defined.

In the configuration of this first alternative form, the two zigzagging narrow grooves 4, 5 are in phase with one another circumferentially and cross the equatorial mid-plane embodied in FIG. 1 by the line XX'. In this way, a central region C is generated, inside which region parts of said two narrow grooves can be found. In this instance, the width of this central region C is equal to 50 mm, and the region is centred on the line XX'.

By virtue of the presence of these two crenellated narrow grooves 4, 5, a surface for heat exchange with the surrounding air is created, this heat exchange surface corresponding to the surface area each of the walls that delimits a narrow groove. Each narrow-groove wall, when new, has a surface area which is approximately equal to five times the equivalent transverse surface area, viewed in section, of the tread, the latter transverse surface area being evaluated by multiplying the width W of the tread by the thickness E of wearable material.

In the first part of the wearing of the tire according to this alternative form, the radially outermost part of the tread is ventilated by the presence of these two zigzagging narrow grooves 4, 5, which have the ability to close up as they enter the contact patch, in order to maintain a suitable level of stiffness when new. After part-wear to a sufficient extent that the zigzagging narrow grooves disappear, the good intrinsic qualities at break of the material of the second layer 222 provide the tire with good integrity.

Figure 2:
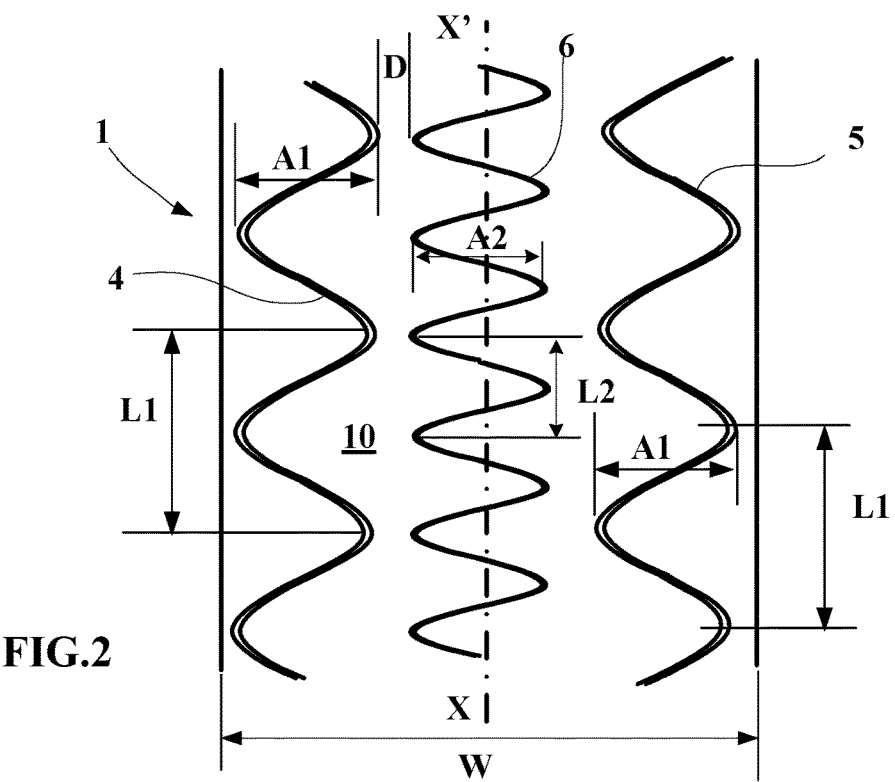
FIG. 2 shows a surface view of a second alternative form of tire according to an embodiment of the invention.

FIG. 2 shows a view of the tread surface 10 of a tread of a tire according to a second alternative form of the invention.

According to this second alternative form, produced in an identical size of tire to that of the first alternative form described having a tread of width W equal to 680 mm, three narrow and continuous grooves 4, 5, 6 running all around the tire and each having a sinusoidal shape are formed by moulding. The edge narrow grooves 4, 5 formed axially furthest towards the outside of the tread each have the same amplitude A1 and wavelength L1 and are arranged in such a way as to be in phase opposition relative to one another.

Formed between these two edge narrow grooves 4, 5 is an intermediate narrow groove 6 having an amplitude A2 and a wavelength L2. This amplitude A2 is, in this instance, identical to the amplitude A1 of the edge narrow grooves. By contrast, the wavelength L2 of the intermediate narrow groove 6 is half the wavelength L1 of the edge narrow grooves. This intermediate narrow groove 6 extends transversely right across the equatorial mid-plane XX' and is in phase with one of the two narrow grooves formed on the edges of the tread.

An empty space D devoid of any cut is left between each pair of narrow grooves 4 and 6 or 6 and 5; each of these spaces D has a width equal to 40 mm.

The width between each edge narrow groove and the closest edge corner is equal to 50 mm.

Figure 3:
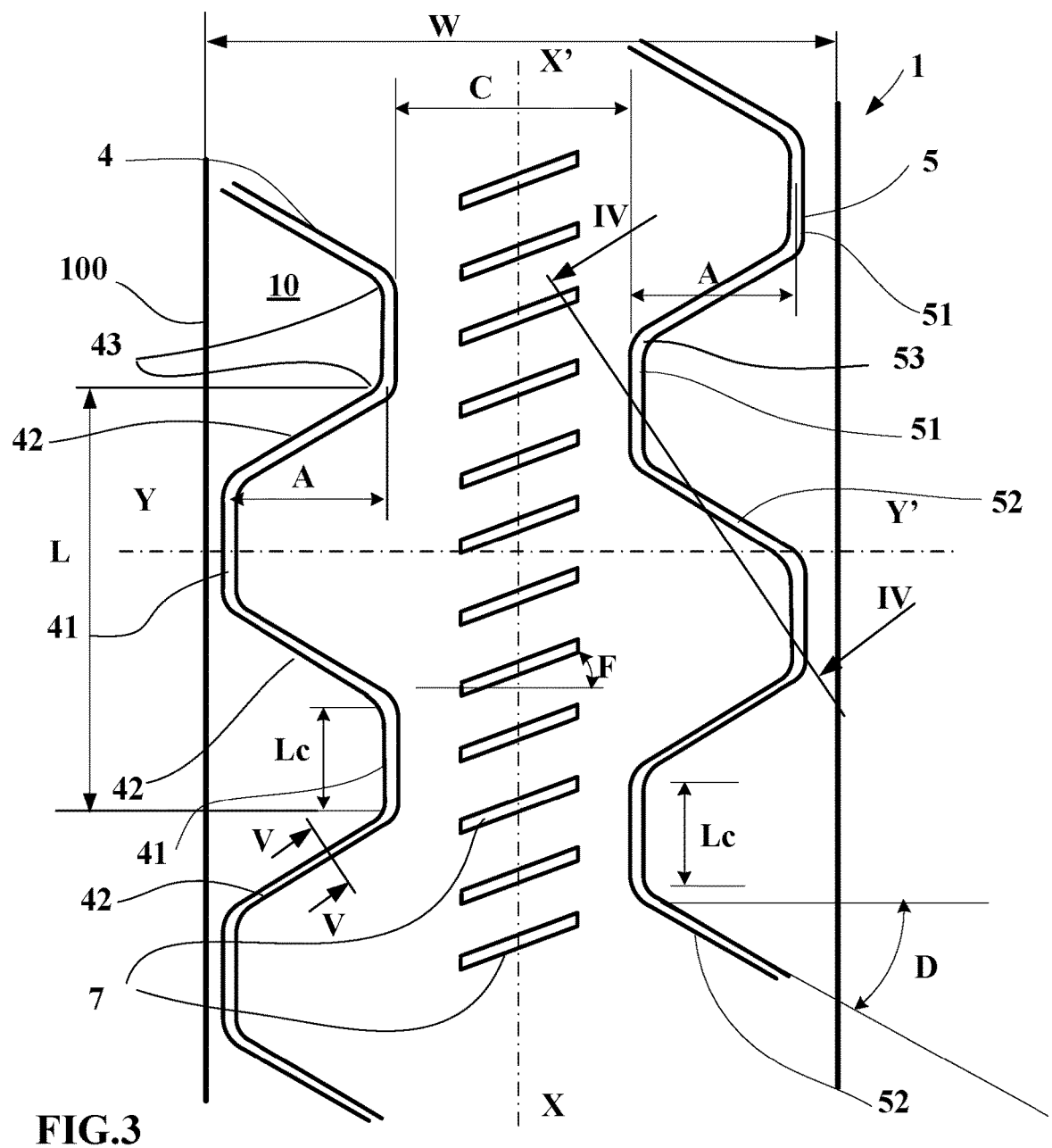
FIG. 3 shows a surface view of a third alternative form of tire according to an embodiment of the invention.

FIG. 3 shows a surface view of a third embodiment according to the invention of a tire of the same size 29.5 R 29. According to this third alternative form, two zigzagging narrow grooves 4, 5 are formed, these two zigzagging narrow grooves delimiting a central region C of width 210 mm. In this alternative form, each narrow groove has a zigzagging shape comprising a succession of circumferentially oriented planar parts 41, 51 of length Lc equal to 60 mm, and of oblique planar parts 42, 52 which are inclined by an angle of 10° with respect to the axial direction of the tire. Each circumferentially oriented planar part is connected to oblique planar parts by curved parts 43, 53 of mean radius equal to 25 mm.

In this alternative form, the amplitude A is equal to 200 mm, and the wavelength is equal to 500 mm.

Furthermore, a plurality of small oblique narrow grooves 7 making an angle of 30° with the axial direction, is formed on the equatorial mid-plane. These small oblique narrow grooves 7 have a depth equal to the depth of the zigzagging narrow grooves and occupy an axial width equal to 20% of the width W of the tread, namely 136 mm; they are centred on the equatorial mid-plane.

In an alternative form which has not been depicted, these small oblique narrow grooves 7 may be replaced by at least one single continuous or discontinuous narrow groove oriented circumferentially to run all around the tire.

Figure 4:
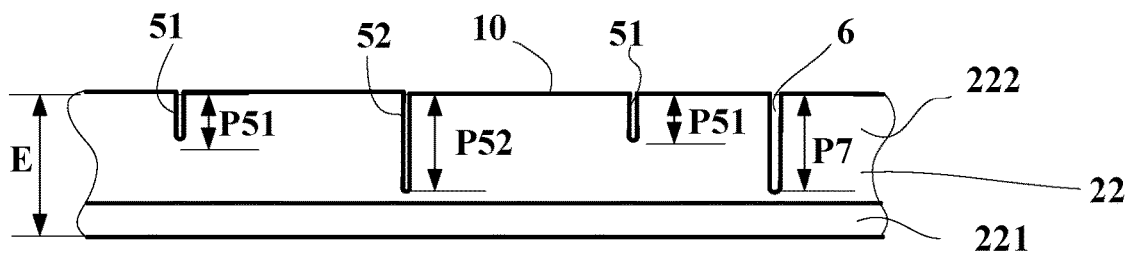

FIG. 4 shows a transverse section through the third alternative form of tire shown in FIG. 3; the plane of section is indicated in FIG. 3 by its line IV-IV. The way in which the first layer 221 and the second layer 222 that form the tread 22 are arranged in the thickness is identical to that described hereinabove for the first alternative form of the invention. In this alternative form, all the circumferential parts 41, 51 of the zigzagging narrow grooves 4, 5 are provided with the bridges connecting the opposing walls of the said groove; this bridging occupies a height equal to 30 mm, measured from the bottom of the narrow grooves.

In the case described in connection with FIGS. 3 and 4, the second layer 222 that makes up the tread 22 is chosen to have a mean deformation at break equal to 775% and an associated energy at break equal to 103 MJ at a temperature of 100° C.

As described above, the width of the narrow grooves is small enough that the opposing walls delimiting the said narrow groove can come at least partially into contact when the groove enters the contact patch in which the tire is in contact with the ground. To achieve this, the width LR of the narrow grooves is preferably less than 15% of the maximum depth of the grooves. In the example of the figures, the maximum depth of the grooves when new is 70 mm, and the width LR of the narrow grooves is 7 mm, namely 10% of the maximum depth.

FIG. 5 depicts a detail of a preferred embodiment of the invention. The plane of section is indicated in FIG. 3 by its line V-V. In this embodiment, the narrow grooves further comprise reduced-width zones 44 in which the width $LR_{mini}$ is comprised between 5% and 75%, and preferably between 5% and 20% of the width LR of the said zigzagging narrow groove. The example depicted corresponds to a width LR of 7 mm, and a width $LR_{mini}$ of 1 mm.

The reduced-width zones are preferably situated in the transversely-oriented parts (42, 52) of the narrow grooves (4, 5).

FIG. 6 depicts an alternative embodiment in which the opposing walls of the reduced-width zones 45 are undulating in order to further promote the stiffness of the tread despite the presence of the cuts. The amplitude and period of the undulations are preferably respectively comprised between 10% and 300% and between 25% and 300% of the width of the grooves LR. The undulations depicted here have an amplitude of 3.4 mm and a period of 8.5 mm.

The reduced-width zones preferably have a radial height HR of at least 10% of the maximum depth of the groove. In the examples depicted, HR is 25 mm.

The reduced-width zones preferably have an axial length Lga of at least 10% of the amplitude A of the groove. In the examples depicted, the length Lga is 70 mm.

For preference, the reduced-width zones are closer to the tread surface when new than to the bottom of the grooves. In the example depicted, the centre of the reduced-width zones is 27 mm from the tread surface 10.

FIG. 7 illustrates an embodiment of the invention in which a canal 46 is formed in the bottom of the narrow grooves, preferably along the entire length of said grooves 4.

FIG. 8 illustrates another embodiment of the invention, showing the volume of the narrow grooves only. In this embodiment, radial wells 47 extend from the bottom of the narrow grooves towards the inside of the tire. As a preference, the said wells are positioned in the curved parts 43 connecting the circumferentially oriented parts 41 and the oblique parts 42 of the narrow grooves 4.

The invention which has been described with the aid of these alternative forms of embodiment is of course not limited to these alternative forms of embodiment alone, and various modifications can be made thereto without departing from the scope as defined by the claims. It is entirely possible to combine these various alternative forms to suit the need, and this can easily be performed by a person skilled in the art.

The invention claimed is:

1. A tire for an off-road vehicle, comprising:
a crown part extended on each side by sidewalls, these sidewalls ending in beads,
a carcass reinforcement extending in the crown part, the sidewalls and the beads,
the crown part comprising:
a crown reinforcement situated radially on the carcass reinforcement, the crown reinforcement comprising:
at least one working reinforcement, and
one protective reinforcement, and
a tread radially on an outside of the crown reinforcement and having a width W and a thickness E of wearable material, this thickness E of wearable material being at least equal to 50 mm, this tread comprising:
a superposition of at least two layers of materials, a first layer located radially on an inside and a second layer located radially on an outside of the first layer to come into contact with ground when the tire is new, this second layer having a thickness E2 comprised between 20% and 90% of the thickness E of wearable material,
at least two narrow grooves defined in the tread running circumferentially all around the tire the at least two narrow grooves being fluidically separate from each other, and axially spaced apart from each other, wherein each groove is formed by two walls that are axially spaced apart from one another and each wall extends circumferentially uninterrupted all around the tire, wherein:
the narrow grooves have a zigzagging overall shape of wavelength L and amplitude A, the wavelength L being between 10% and 120% of the axial width W of the tread, and the amplitude A being between 10% and 75% of the axial width W, and
the material of the first layer of the tread is chosen to have low hysteresis; wherein the measured $\tan(\delta)$ value of the material of the first layer is at most equal to 0.30.

2. The tire for an off-road vehicle according to claim 1, wherein the material adopted for the first layer of the tread is a material that has a $\tan(\delta)$ value at most equal to 0.20.

3. The tire for an off-road vehicle according to claim 1, wherein the amplitude A of the zigzagging narrow grooves is between 10% and 40% of the width W of the tread.

4. The tire for an off-road vehicle according to claim 1, wherein each zigzagging narrow groove has a maximum depth which is at least equal to 20% of the thickness E of wearable material and at most equal to 90% of the thickness E.

5. The tire for an off-road vehicle according to claim 4, wherein each zigzagging narrow groove has a maximum depth of wearable material being between 40% and 70% of the thickness E.

6. The tire for an off-road vehicle according to claim 1, wherein the tread comprises two zigzagging narrow grooves situated on each side of the equatorial mid-plane, each zigzagging narrow groove being formed entirely in one half of the width of the tread, so that there is delimited, between the zigzagging narrow grooves, a central part (C) of a width between 0% and 70% of the width W of the tread.

7. The tire for an off-road vehicle according to claim 6, wherein the width of the central part (C) is between 40% and 70% of the width W of the tread.

8. The tire for an off-road vehicle according to claim 1, wherein each zigzagging narrow groove comprises a plurality of groove parts oriented chiefly circumferentially, each of these parts having a length Lc measured in projection onto the circumferential direction, each narrow groove further comprises a plurality of groove parts oriented transversely or obliquely at an angle at most equal to 45 degrees to the axial direction.

9. The tire for an off-road vehicle according to claim 8, wherein a plurality of bridges are created in the zigzagging narrow grooves, at least in the groove parts oriented chiefly circumferentially and situated axially furthest towards the outside, each bridge being formed from the bottom of the narrow grooves and locally reduces the depth of these narrow grooves by at least 20% of the maximum depth of these narrow grooves.

10. The tire for an off-road vehicle according to claim 1, wherein the width (LR) of each of the zigzagging narrow grooves is less than 15% of the maximum depth of the said narrow grooves.

11. The tire for an off-road vehicle according to claim 10, wherein each zigzagging narrow groove further comprises a plurality of reduced-width zones in which the width ($LR_{mini}$) is comprised between 5% and 75% of the width (LR) of the zigzagging narrow grooves.

12. The tire for an off-road vehicle according to claim 11, wherein the reduced-width zones are situated in groove parts of the narrow grooves which are oriented at an angle at most equal to 45 degrees to the axial direction.

13. The tire for an off-road vehicle according to claim 11, wherein the reduced-width zones have undulating walls facing one another.

14. The tire for an off-road vehicle according to claim 11, wherein the plurality of reduced-width zones has a width ($LR_{mini}$) of between 5% and 20% of the width (LR) of the zigzagging narrow grooves.

15. The tire for an off-road vehicle according to claim 10, wherein the width (LR) of each of the zigzagging narrow grooves is less than 12% of the maximum depth of the said narrow grooves.

16. The tire for an off-road vehicle according to claim 1, wherein each zigzagging narrow-groove wall, when new, has a surface area which is between three and seven times the equivalent transverse surface area of the tread, the latter surface area being the product of the width W of the tread times the thickness E of wearable material.

17. The tire for an off-road vehicle according to claim 1, wherein the zigzagging narrow grooves are phase-shifted relative to one another in the circumferential direction so as to reduce the vibrations caused by their presence.

18. The tire for an off-road vehicle according to claim 1, wherein a third narrow groove of zigzagging overall shape is formed axially between the two zigzagging narrow grooves.

19. The tire for an off-road vehicle according to claim 18, wherein the third narrow groove of zigzagging overall shape is formed in phase with one of the two zigzagging narrow grooves.

20. The tire for an off-road vehicle according to claim 1, wherein the second layer of which the tread is made has a tear index, defined as being a mean deformation at break, which is at least equal to 400%, and an energy at break at least equal to 50 MJ.

* * * * *